US006996575B2

(12) United States Patent
Cox et al.

(10) Patent No.: US 6,996,575 B2
(45) Date of Patent: Feb. 7, 2006

(54) COMPUTER-IMPLEMENTED SYSTEM AND METHOD FOR TEXT-BASED DOCUMENT PROCESSING

(75) Inventors: James A. Cox, Raleigh, NC (US); Oliver M. Dain, Belmont, MA (US)

(73) Assignee: SAS Institute Inc., Cary, NC (US)

( * ) Notice: Subject to any disclaimer, the term of this patent is extended or adjusted under 35 U.S.C. 154(b) by 594 days.

(21) Appl. No.: 10/159,792

(22) Filed: May 31, 2002

(65) Prior Publication Data

US 2003/0225749 A1 Dec. 4, 2003

(51) Int. Cl.
*G06F 17/00* (2006.01)

(52) U.S. Cl. .................................................... 707/102

(58) Field of Classification Search .............. 707/1–10, 707/100, 102
See application file for complete search history.

(56) References Cited

U.S. PATENT DOCUMENTS

| | | | | |
|---|---|---|---|---|
| 5,857,179 | A * | 1/1999 | Vaithyanathan et al. | 707/2 |
| 5,974,412 | A | 10/1999 | Hazlehurst et al. | |
| 5,978,837 | A | 11/1999 | Foladare et al. | |
| 5,983,214 | A * | 11/1999 | Lang et al. | 707/1 |
| 5,983,224 | A | 11/1999 | Singh et al. | |
| 5,986,662 | A | 11/1999 | Argiro et al. | |
| 6,006,219 | A | 12/1999 | Rothschild | |
| 6,012,058 | A | 1/2000 | Fayyad et al. | |
| 6,032,146 | A | 2/2000 | Chadha et al. | |
| 6,055,530 | A | 4/2000 | Sato | |
| 6,092,072 | A | 7/2000 | Guha et al. | |
| 6,119,124 | A | 9/2000 | Broder et al. | |
| 6,122,628 | A | 9/2000 | Castelli et al. | |
| 6,134,541 | A | 10/2000 | Castelli et al. | |
| 6,134,555 | A | 10/2000 | Chadha et al. | |
| 6,137,493 | A | 10/2000 | Kamimura et al. | |
| 6,148,295 | A | 11/2000 | Megiddo et al. | |
| 6,167,397 | A * | 12/2000 | Jacobson et al. | 707/5 |
| 6,192,360 | B1 * | 2/2001 | Dumais et al. | 707/6 |
| 6,195,657 | B1 | 2/2001 | Rucker et al. | |
| 6,260,036 | B1 | 7/2001 | Almasi et al. | |
| 6,263,309 | B1 | 7/2001 | Nguyen et al. | |
| 6,263,334 | B1 * | 7/2001 | Fayyad et al. | 707/5 |
| 6,289,353 | B1 | 9/2001 | Hazlehurst et al. | |
| 6,332,138 | B1 | 12/2001 | Hull et al. | |
| 6,349,296 | B1 | 2/2002 | Broder et al. | |
| 6,349,309 | B1 | 2/2002 | Aggarwal et al. | |
| 6,363,379 | B1 | 3/2002 | Jacobson et al. | |
| 6,374,270 | B1 | 4/2002 | Maimon et al. | |

(Continued)

OTHER PUBLICATIONS

Furnas et al, "Information Retrieval using a Singular Value Decomposition Model of Latent Semantic Structure", ACM 1988, pp. 465-480.*

*Primary Examiner*—Uyen Le
(74) *Attorney, Agent, or Firm*—Jones Day

(57) ABSTRACT

A computer-implemented system and method for processing text-based documents. A frequency of terms data set is generated for the terms appearing in the documents. Singular value decomposition is performed upon the frequency of terms data set in order to form projections of the terms and documents into a reduced dimensional subspace. The projections are normalized, and the normalized projections are used to analyze the documents.

60 Claims, 20 Drawing Sheets

U.S. PATENT DOCUMENTS

| | | | | |
|---|---|---|---|---|
| 6,381,605 | B1 | 4/2002 | Kothuri et al. | |
| 6,446,068 | B1 | 9/2002 | Kortge | |
| 6,470,344 | B1 | 10/2002 | Kothuri et al. | |
| 6,505,205 | B1 | 1/2003 | Kothuri et al. | |
| 6,728,695 | B1 * | 4/2004 | Pathria et al. | 707/2 |
| 6,795,820 | B2 * | 9/2004 | Barnett | 707/3 |
| 6,917,952 | B1 * | 7/2005 | Dailey et al. | 707/203 |
| 2003/0050921 | A1 * | 3/2003 | Tokuda et al. | 707/3 |

* cited by examiner

154

| Cat | Document |
| --- | --- |
| fin | 1 route the cash and the check to the bank |
| fin | 2 borrow with credit borrow based on credit |
| fin | 3 I can borrow cash from the bank |
| riv | 4 river boat floats up the river |
| riv | 5 boat is by the dock near the bank |
| riv | 6 the river boat is on the south bank |
| riv | 7 the boat floats by the dock near the river bank |
| par | 8 check the parade route to see the floats |
| par | 9 the parade the parade the parade |

Term-Document Frequency Matrix, A

| Terms | | | Documents 1 | 2 | 3 | 4 | 5 | 6 | 7 | 8 | 9 |
|---|---|---|---|---|---|---|---|---|---|---|---|
| | route | 1 | 1 | | | | | | | 1 | |
| | cash | 2 | 1 | | 1 | | | | | | |
| | check | 3 | 1 | | | | | | | 1 | |
| | bank | 4 | 1 | | 1 | 1 | | 1 | 1 | | |
| | borrow | 5 | | 2 | 1 | | | | | | |
| | credit | 6 | | 2 | | | | | | | |
| | river | 7 | | | | 2 | | 1 | 1 | | |
| | boat | 8 | | | | 1 | 1 | 1 | 1 | | |
| | floats | 9 | | | | 1 | | | 1 | 1 | |
| | dock | 10 | | | | | 1 | | 1 | | |
| | south | 11 | | | | | | 1 | | | |
| | parade | 12 | | | | | | | | 1 | 3 |

| | | Terms | | | | | | |
|---|---|---|---|---|---|---|---|---|
| | | cash | check | borrow | credit | dock | south | parade |
| Documents | 1 | 1 | 1 | | | | | |
| | 2 | | | 2 | 2 | | | |
| | 3 | 1 | | 1 | | | | |
| | 4 | | | | | | | |
| | 5 | | | | | 1 | | |
| | 6 | | | | | | 1 | |
| | 7 | | | | | 1 | | |
| | 8 | | 1 | | | | | 1 |
| | 9 | | | | | | | 3 |

| Category | train | val | test |
|---|---|---|---|
| earn | 2305 | 572 | 1087 |
| acq | 1242 | 408 | 719 |
| money_fx | 345 | 193 | 179 |
| grain | 303 | 129 | 149 |
| crude | 324 | 65 | 189 |
| trade | 274 | 95 | 117 |
| interest | 229 | 118 | 131 |
| wheat | 144 | 67 | 71 |
| ship | 136 | 61 | 89 |
| corn | 140 | 41 | 56 |

FIG. 10

| Category | Best with Local-Global | Local-Global Used | Mutual Information Results |
|---|---|---|---|
| earn | 98.5 | log-ent | 97.5 |
| acq | 94.0 | log-idf | 87.0 |
| money-fx | 82.1 | log-idf | 68.3 |
| grain | 83.2 | log-ent | 88.9 |
| crude | 86.8 | log-idf | 78.2 |
| trade | 81.1 | log-ent | 66.6 |
| interest | 77.6 | log-ent | 58.7 |
| ship | 83.5 | bin-ent | 60.2 |
| wheat | 77.8 | log-idf | 79.1 |
| corn | 67.3 | log-ent | 80.1 |
| microavg. | 89.7 | | 83.7 |

FIG. 11

| | SVD MBR | SVD Neural | Trunc MBR | Trunc Neural |
|---|---|---|---|---|
| earn | 97.5 | 97.3 | 96.3 | 96.7 |
| acq | 87.0 | 90.5 | 74.9 | 83.5 |
| money-fx | 68.3 | 70.0 | 50.7 | 55.1 |
| grain | 88.9 | 87.7 | 87.6 | 90.6 |
| crude | 78.2 | 84.4 | 73.0 | 78.1 |
| trade | 66.6 | 65.5 | 62.7 | 60.8 |
| interest | 58.7 | 66.2 | 51.7 | 42.7 |
| ship | 60.2 | 82.3 | 60.8 | 59.6 |
| wheat | 79.1 | 83.1 | 85.6 | 77.0 |
| corn | 80.1 | 79.5 | 87.1 | 80.4 |
| microavg. | 83.7 | 86.2 | 77.9 | 79.8 |

FIG. 12

COMPUTER-IMPLEMENTED SYSTEM AND METHOD FOR TEXT-BASED DOCUMENT PROCESSING

FIELD OF THE INVENTION

The present invention relates generally to computer-implemented text processing and more particularly to document collection analysis.

BACKGROUND AND SUMMARY

The automatic classification of document collections into categories is an increasingly important task. Examples of document collections that are often organized into categories include web pages, patents, news articles, email, research papers, and various knowledge bases. As document collections continue to grow at remarkable rates, the task of classifying the documents by hand can become unmanageable. However, without the organization provided by a classification system, the collection as a whole is nearly impossible to comprehend and specific documents are difficult to locate.

The present invention offers a unique document processing approach. In accordance with the teachings of the present invention, a computer-implemented system and method are provided for processing text-based documents. A frequency of terms data set is generated for the terms appearing in the documents. Singular value decomposition is performed upon the frequency of terms data set in order to form projections of the terms and documents into a reduced dimensional subspace. The projections are normalized, and the normalized projections are used to analyze the documents.

BRIEF DESCRIPTION OF THE DRAWINGS

FIG. 3 is a tabular display of an example document to be processed;

FIG. 4 is a tabular display of a frequency matrix constructed from the example document of FIG. 3;

FIG. 8 is a tabular display depicting results in handling a document collection through a truncation technique;

FIGS. 10–12 are tabular displays associated with the document processing system's exemplary use within a predictive modeling application;

DETAILED DESCRIPTION

Figure 1:
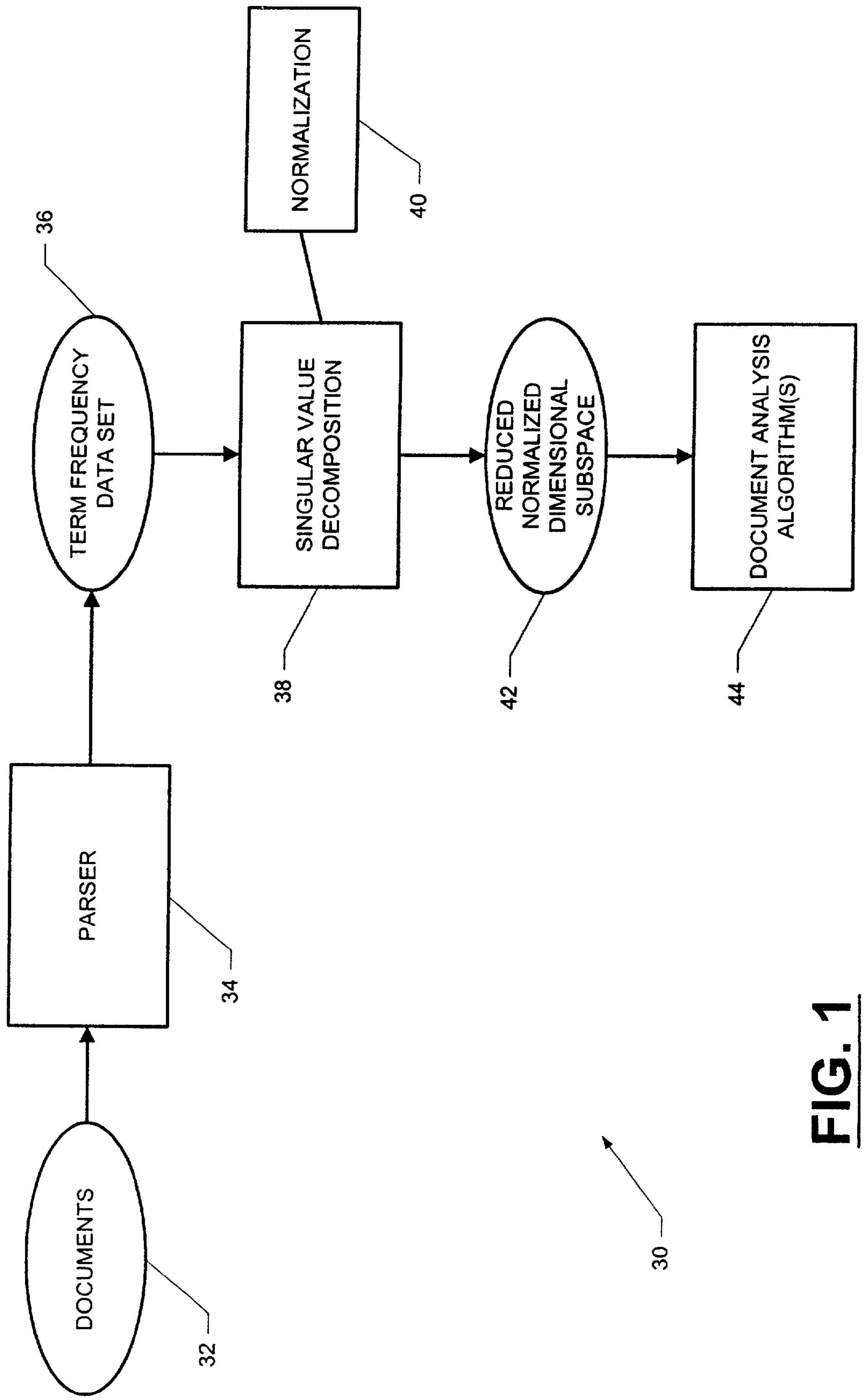
FIG. 1 is a block diagram depicting software and computer components utilized in processing documents.

FIG. 1 depicts a computer-implemented system 30 that analyzes term usage within a set of documents 32. The analysis allows the documents 32 to be clustered, categorized, combined with other documents, made available for information retrieval, as well as be used with other document analysis applications. The documents 32 may be unstructured data, such as free-form text and images. While in such a state, the documents 32 are unsuitable for classification without elaborate hand coding from someone viewing every example to extract structured information. The document processing system 30 converts the informational content of an unstructured document 32 into a structured form. This allows users to fully exploit the informational content of vast amounts of textual data.

The document processing system 30 uses a parser software module 34 to define a document as a "bag of terms", where a term can be a single word, a multi-word token (such as "in spite of", "Mississippi River"), or an entity, such as a date, name, or location. The bag of terms is stored as a data set 36 that contains the frequencies that terms are found within the documents 32. This data set 36 of documents versus term frequencies is subject to a Singular Value Decomposition (SVD) 38, which is an eigenvalue decomposition of the rectangular, un-normalized data set 36.

Normalization 40 is then performed so that the documents and terms can be projected into a reduced normalized dimensional subspace 42. The normalization process 40 normalizes each projection to have a length of one—thereby effectively forcing each vector to lie on the surface of the unit sphere around zero. This makes the sum of the squared distances of each element of their vectors to be isomorphic to the cosines between them, and they are immediately amenable to any algorithm 44 designed to work with such data. This includes almost any algorithm currently used for clustering, segmenting, profiling and predictive modeling, such as algorithms that assume that the distance between objects can be represented by a summing of the distances or the squared distances of the individual attributes that make up that object. In addition, the normalized dimension values 42 can be combined with any other structured data about the document to enhance the predictive or clustering activity.

Figure 2A:
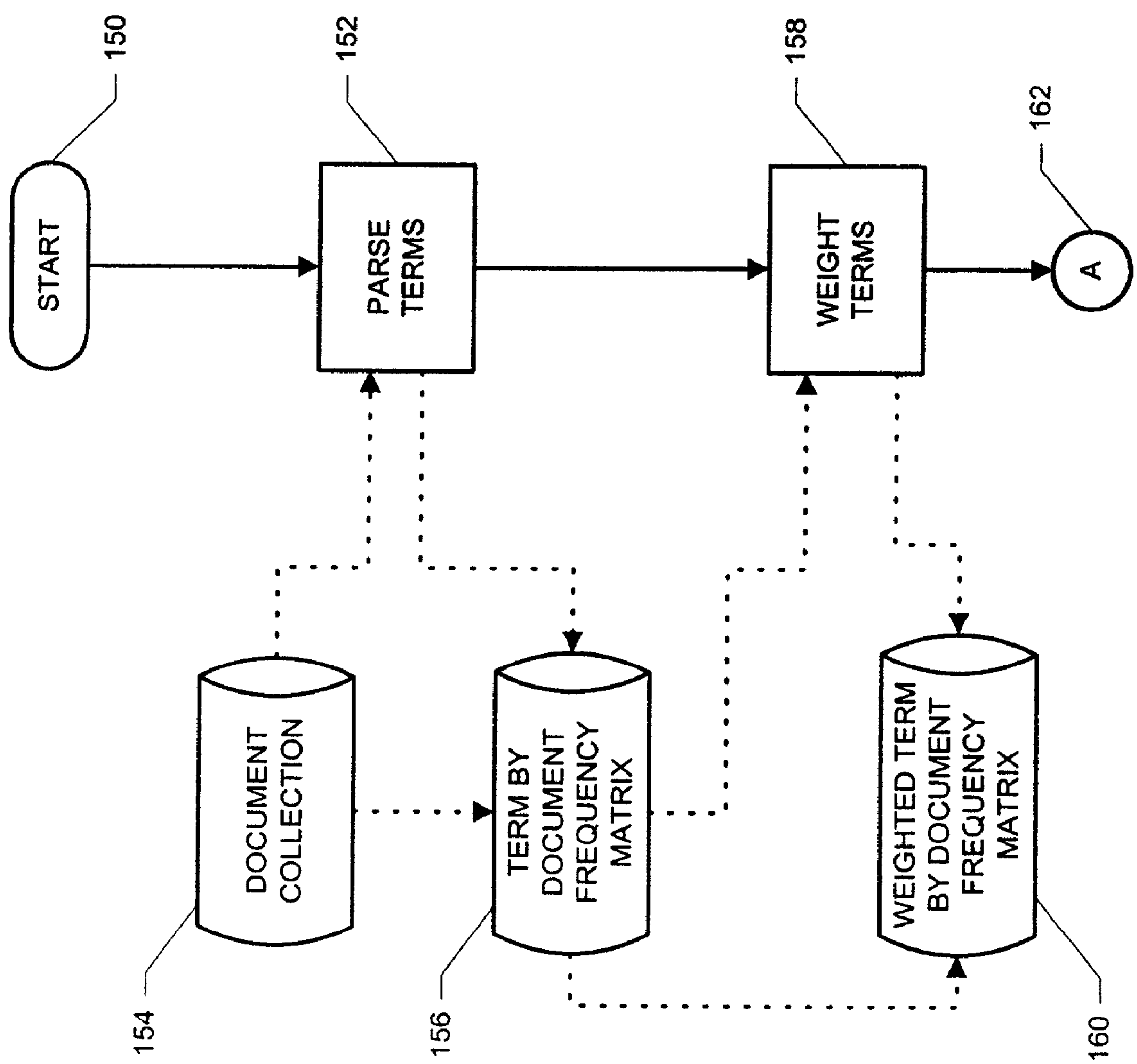
FIGS. 2A and 2B are flowcharts depicting an example of processing a document.
Figure 2B:
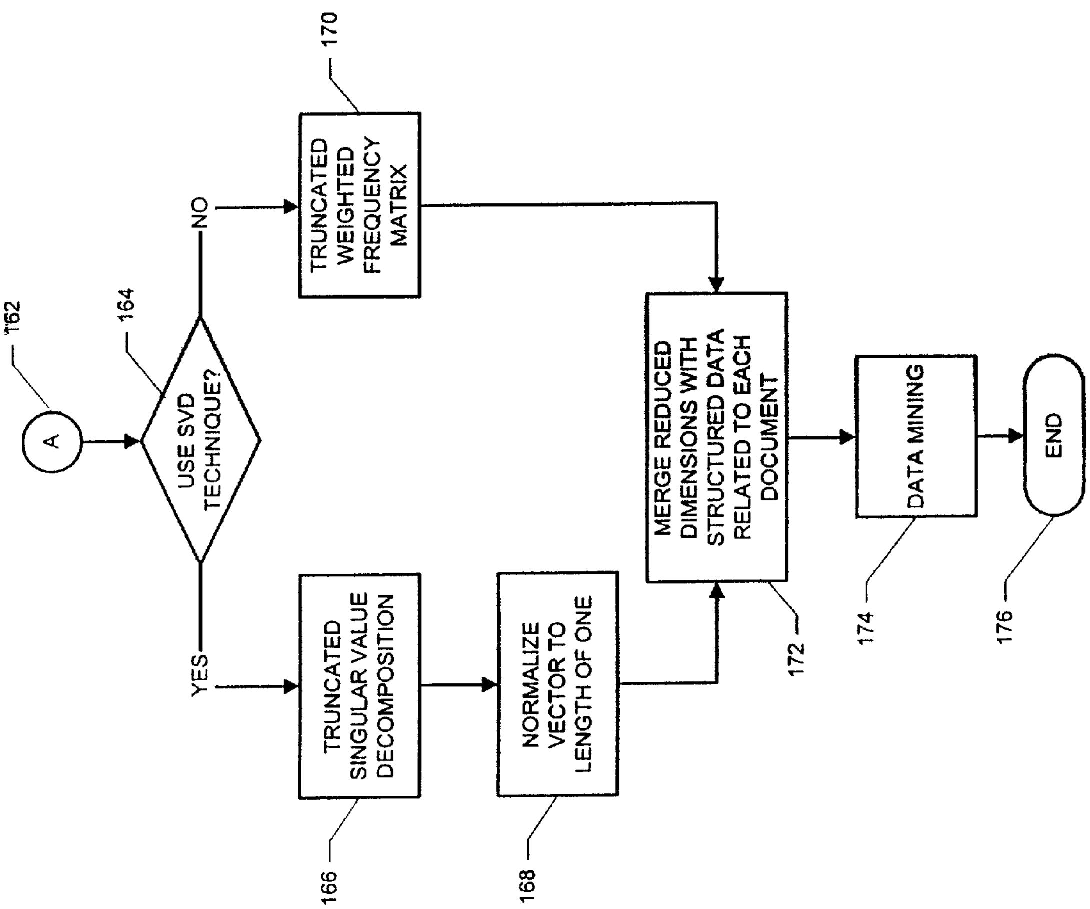

FIGS. 2A and 2B are flowcharts depicting an example of processing a document collection 154. With reference to FIG. 2A, start indication block 150 indicates that process block 152 is executed. At process block 152, terms from a document collection 154 are parsed in order to form a term by document frequency matrix 156. As an example, FIG. 3 displays a sample document collection 154 containing nine documents 200. Twelve terms (e.g., terms "route" 202, "case" 204, etc.) are indexed. The remaining terms have been removed by a stop list. Each document belongs to one of the categories 204: financial (fin), river (riv) or parade (par). FIG. 4 shows a frequency matrix 156 constructed from the document collection 154 of FIG. 3. To represent the frequency associated with the collection of documents in this example, a vector space model is used. In this approach, documents are represented as vectors of length n, where n is the number of unique terms that are indexed in the collection. The vector for each document is typically very sparse because few of the terms in the collection as a whole are contained in any one given document. The entries in the vector are the frequency that each term occurs in that document. If m is the number of documents in the collection, we now have an n by m matrix a that represents the document collection. Typically, the matrix is oriented with the rows representing terms and the columns representing documents. As an illustration, Document 1 shown in column 220 of FIG. 4 has listed the four terms "route" 202, cash 204, check 206, and bank 208. Column 220 has a value of one for each of these entries because they appear but once in Document 1 (of FIG. 3). As another illustration, the term route 202 is listed in Document 8's column 230 with a value of one because the term "route" appears but once in Document 8 (of FIG. 3). Note that in this example the cells with a zero entry are left empty for readability.

With reference back to FIG. 2A, the terms in the frequency matrix 156 are then weighted at process block 158 and stored in matrix 160. Weighting may be used to provide better discrimination among documents. For example, process block 158 may assign a high weight to words that occur frequently but in relatively few documents. The documents that contain those terms will be easier to set apart from the rest of the collection. On the other hand, terms that occur in every document may receive a low weight because of their inability to discriminate between documents.

As an example, different types of weightings may be applied to the frequency matrix 156, such as local weights (or cell weights) and global weights (or term weights). Local weights are created by applying a function to the entry in the cell of the term-document frequency matrix 156. Global weights are functions of the rows of the term-document frequency matrix 156. As a result, local weights deal with the frequency of a given term within a given document, while global weights are functions of how the term is spread out across the document collection.

Many different variations of local weights may be used (as well as not using a local weight at all). For example, the binary local weight approach sets every entry in the frequency matrix to a 1 or a 0. In this case, the number of times the term occurred is not considered important. Only information about whether the term did or did not appear in the document is retained. Binary weighting may be expressed as:

$$a_{ij} = bin(f_{ij}) = \begin{cases} 1, & f_{ij} > 0 \\ 0, & f_{ij} = 0 \end{cases}$$

(where: A is the term-frequency matrix with entries $a_i$.)

Another example of local weighting is the log weighting technique. For this local weight approach, each entry is operated on by the log function. Large frequencies are dampened but they still contribute more to the model than terms that only occurred once. The log weighting may be expressed as:

$$a_{ij} = \log(f_{ij}+1).$$

Many different variations of global weights may be used (as well as not using a global weight at all), such as:

1. Entropy—This setting calculates one minus the scaled entropy so that the highest weight goes to terms that occur infrequently in the document collection as a whole, but frequently in a few documents. With n being the number of terms in the matrix A. Let $$p_{ij} = \frac{f_{ij}}{\sum_j f_{ij}}$$

be the probability that term i is found in document j and let $$d_i = \sum_j bin(f_{ij})$$

be the number of documents containing term i. Then, entropy may be expressed as:

$$g_i = 1 + \sum_j \frac{p_{ij}\log(p_{ij})}{\log(n)}$$

2. Inverse Document Frequency (IDF)—Dividing by the document frequency is another approach that emphasizes terms that occur in few documents. IDF may be expressed as:

$$g_i = \log\left(\frac{n}{d_i}\right) + 1$$

3. Global Frequency Times Inverse Document Frequency (GFIDF)—This setting magnifies the inverse document frequency by multiplying by the global frequency. GFIDF may be expressed as:

$$g_i = \frac{\sum_j f_{ij}}{d_i}$$

4. Normal—This setting scales the frequency. Entries are proportional to the entry in the term-document frequency matrix, and the normal settings may be calculated as follows:

$$g_i = \frac{1}{\sum_j f_{ij}^2}$$

A global weight $g_1$ provides an individual weight for term i. The global weight is applied to the matrix A by calculating $a_{ij}g_i$ for all i.

Figure 5:
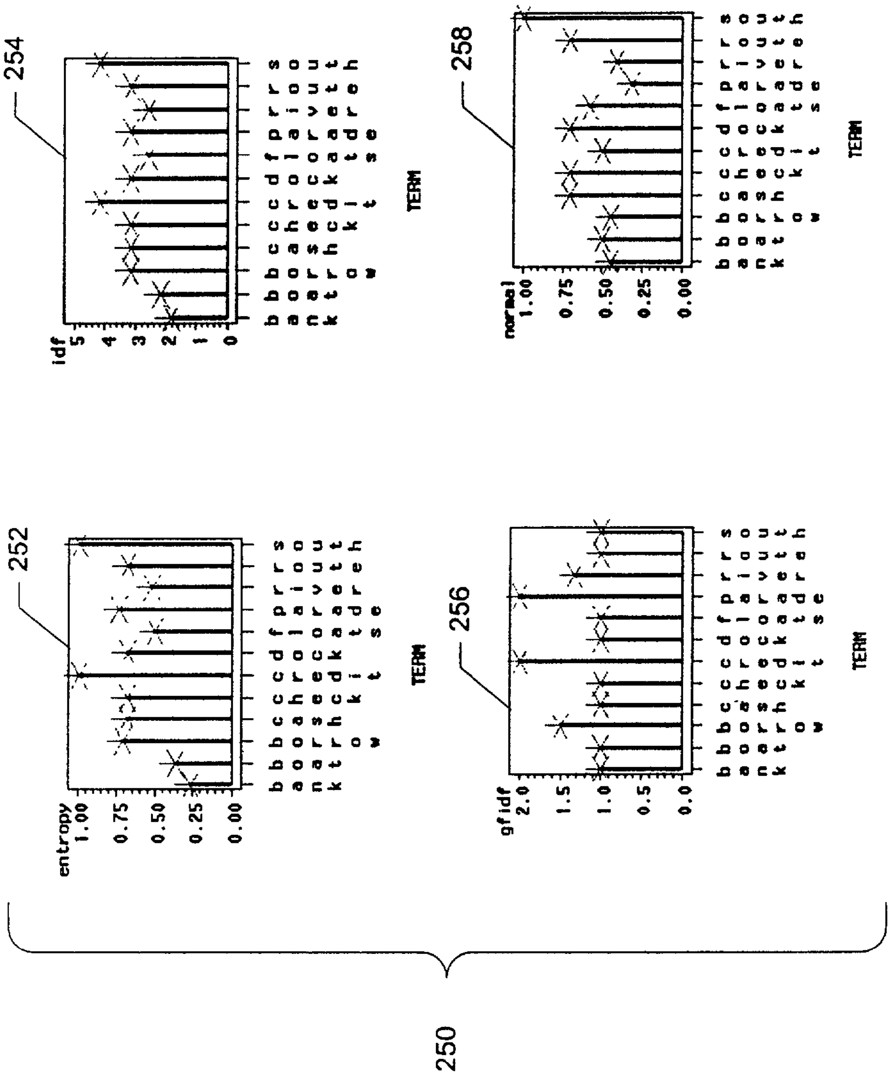
FIG. 5 is a graphical display output depicting different weighting graphs associated with the processing of an example document.

In FIG. 5, the four global weights discussed above are applied to the document collection 154 shown in FIG. 3. The plots 250 reveal the weighting for each of the twelve indexed words (of FIG. 4). Graph 252 shows the application of the entropy global weighting. Graph 252 depicts the twelve indexed terms along the abscissa axis and the entropy values along the ordinate axis. The entropy values have an inclusive range between zero and one. Graph 254 shows the application of the IDF global weighting. Graph 254 depicts the twelve indexed terms along the abscissa axis and the IDF values along the ordinate axis. In this situation, the IDF values have an inclusive range between zero and five. Graph 256 shows the application of the GFIDF global weighting. Graph 256 depicts the twelve indexed terms along the abscissa axis and the GFIDF values along the ordinate axis. In this situation, the GFIDF values have an inclusive range between zero and two. Graph 258 shows the application of the normal global weighting. Graph 258 depicts the twelve indexed terms along the abscissa axis and the normal values along the ordinate axis. In this situation, the normal values have an inclusive range between zero and one. As an illustration, the term "bank" which is contained in many of the documents has a low weight in each of the cases. On the other hand, most of the weighting schemes assign relatively high weight to "parade" which occurs three times but in a single document.

It is also possible to implement weighting schemes that make use of the target variable. Such weighting schemes include information gain, $\chi^2$, and mutual information and may be used with the normalized SVD approach (note that these weighting schemes are generally discussed in the following work: Y. Yang and J. Pedersen, A comparative study on feature selection in text categorization. In Machine Learning: Proceedings of the Fourteenth International Conference (ICML'97), 412–420, 1997).

As an illustration, the mutual weighting scheme is considered. The mutual information weightings may be given as follows:

Let $x_i$ represent the binary random variable for whether term $t_i$ occurs and let c be the binary random variable representing whether a particular category occurs. Consider the two-way contingency table for $x_i$ and c given follows:

| | | Category c | |
|---|---|---|---|
| | | 1 | 0 |
| Term xi, | 1 | A | B |
| | 0 | C | D |

A represents the number of times $x_i$ and c co-occur, B is the number of times that $x_i$ occurs without c, C is the number of times c occurs without $x_i$, and D represents the number of times that both $x_i$ and c do not occur. As before, m is the number of documents in the collection so that n=A+B+C+D. Define $P(x_i)$ to be:

$$P(x_i = 1) = \frac{A+B}{m} \text{ and } P(x_i = 0) = \frac{C+D}{m};$$

P(c) to be:

$$P(c = 1) = \frac{A+C}{m} \text{ and } P(c = 0) = \frac{B+D}{m};$$

and $P(x_i,c)$ to be:

$$P(x_i = 1, c = 1) = \frac{A}{m},$$

-continued $$P(x_i = 1, c = 0) = \frac{B}{m},$$

$$P(x_i = 0, c = 1) = \frac{C}{m},$$

and $$P(x_i = 0, c = 0) = \frac{D}{m}$$

The mutual information $MI(t_i,c)$ between a term $t_i$ and a category c is a variation of the entropy calculation given above. It may be expressed as:

$$MI(x_i, c) = \sum_{x_i,c} p(x_i, c)\log\left(\frac{p(x_i, c)}{p(x_i)P(c)}\right)$$

Figure 6:
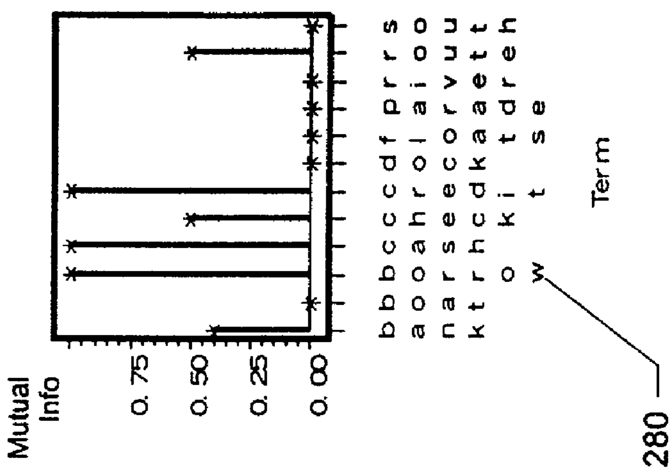
FIG. 6 is a tabular display depicting mutual information weightings for document terms.

As shown by this mathematical formulation, mutual information provides an indication of the strength of dependence between $x_i$ and c. If $t_i$ and c have a large mutual information, the term will be useful in distinguishing when the category c occurs. FIG. 6 illustrates application of the mutual information weightings (scaled to be between 0 and 1) to the terms in the financial category of FIG. 3. Terms that only appear in the financial category (such as the term "borrow" 280) have a weight of 1, terms that do not appear in the financial category have a weight of 0, and terms that appear in both categories have a weight between 0 and 1. Note how different these weightings are than in the four graphs (252, 254, 256, 258) of FIG. 5.

After the terms are weighted (or not weighted as the case may be), processing continues on FIG. 2B at decision block 164 as indicated by the continuation block 162. The decision block 164 inquires whether dimensionality is to be reduced through a SVD approach. If it is, then process blocks 166 and 168 are performed. Process block 166 reduces the dimension of the weighted term-document frequency matrix from n-dimensional space to k-dimensional subspace by using a truncated singular value decomposition (SVD) of the matrix. The truncated SVD is a form of an orthogonal matrix factorization and may be defined as follows:

Without loss of generality, let m be greater than or equal to n. A m by n matrix A, can be decomposed into three matrices:

$$A=U\Sigma V^t$$

where:

$$U^tU=V^tV=I:$$

and $$\Sigma=\text{diag}(\sigma_1,\sigma_2, \ldots, \sigma_n).$$

The columns of U and V are referred to as the left and right singular vectors, respectively, and the singular values of A are defined by the diagonal entries of Σ. If the rank of A is r and r<n then $\sigma_{r+1}, \sigma_{r+2}, \ldots, \sigma_n=0$. The SVD provides that:

$$A_k=\Sigma u_i\cdot\sigma_i\cdot v_i^t,$$

k<n, which provides the least squares best fit to A. The process of acquiring $A_k$ is known as the forming the truncated SVD. The higher the value of k, the better typically the approximation to A.

As a result of the SVD process, documents are represented as vectors in the best-fit k-dimensional subspace. The similarity of two documents can be assessed by the dot products of the two vectors. In addition the dimensions in the subspace are orthogonal to each other. The document vectors are then normalized at process block 168 to a length of one. This is done because most clustering and predictive modeling algorithms work by segmenting Euclidean distance. This essentially places each one on the unit hypersphere, so that Euclidean distances between points will directly correspond to the dot products of their vectors. It should be understood that the value of one for normalization was selected here only for convenience; the vectors may be normalized to any constant. The process block 168 performs normalization by adding up the squares of the elements of the vector, and dividing each of the elements by that total.

Figure 7:
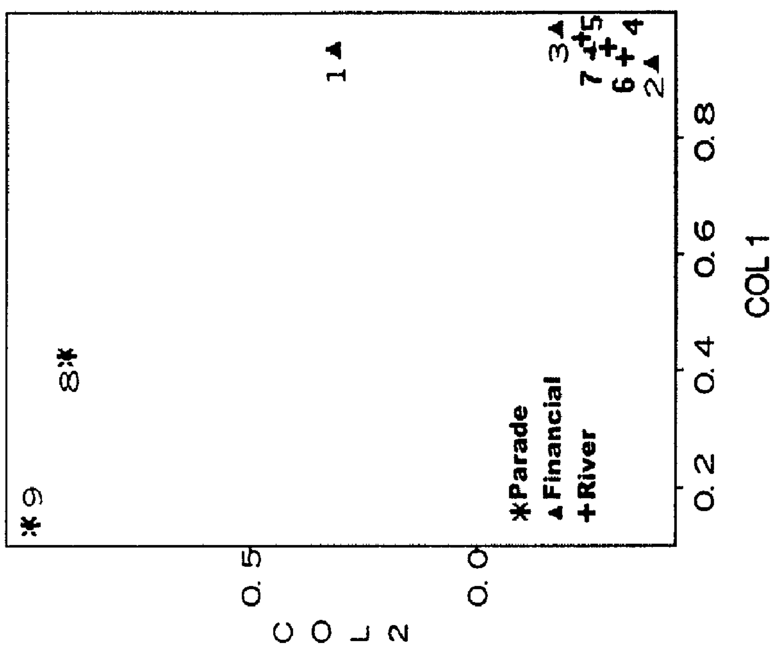
FIG. 7 is an x-y graph depicting results in handling a document collection through the document processing system.

In the ongoing example of processing the documents of FIG. 3, setting k to be two in the SVD process is sufficient to incorporate much of the similarity information. Accordingly, the document vectors are reduced to two dimensions and the results are plotted in FIG. 7. The plot of FIG. 7 depicts the normalized projections of the documents into a reduced two-dimensional subspace of the SVD. Note that this two-dimensional projection correctly places Document 1 closer to Document 2 than it is to Document 8, even though the word overlap is less. This is due to the ability of the SVD to take into account semantic similarity rather than simple word similarity. Accordingly, within the normalized subspace, the projection automatically accounts for polysemy and synonymy in that words that are similar end up projected close (by the measure of the cosines between them) to one another, and documents that share similar content but not necessarily the same words also end up projected close to one another.

Note in FIG. 7 the circular arrangement of the points. Due to the normalization process, the points in two dimensions are arranged in a half-circle. It is also noted that in larger examples, many more dimensions may be required, anywhere from several to several hundred, depending on the domain. It should be small enough that most of the noise is incorporated in the non-included dimensions, while including most of the signal in the reduced dimensions. Mathematically, the reduced normalized dimensional subspace retains the maximum amount of information possible in the dimensionality of that subspace.

After the vectors have been normalized to a length of one at process block 168 in FIG. 2B, then at process block 172 the reduced dimensions are merged with the structured data that are related to each document. Before processing terminates at end block 176, data mining is performed at process block 174 in order to perform predictive modeling, clustering, visualization or other such operations.

If the user had wished to perform a truncation technique, then processing branches from decision block 164 to process block 170. At process block 170, the weighted frequencies are truncated. This technique determines a subset of terms that are most diagnostic of particular categories and then tries to predict the categories using the weighted frequencies of each of those terms in each document. In the present example, the truncation technique discards words in the term-document frequency matrix that have a small weight. Although the document collection of FIG. 3 has very few dimensions, the truncation technique is examined using the entropy weighting of graph 252 in FIG. 5. Based on the entropy graph 252, we may decide to index only the terms "borrow", "cash", "check", "credit", "dock", "parade", and "south" because these were the k=7 terms with the highest entropy weighting. As a result, the dimension of the example is reduced from 12 to 7 by using the contents of the table shown in FIG. 7 rather than the representation contained in FIG. 3. Note also that we have transposed the results so that observations are documents and variables are terms. The use of the representation in the table of FIG. 8, although it is more condensed than that given in the document collection of FIG. 3, still makes it difficult to compare documents. Notice that if the co-occurrence of items from the table of FIG. 8 is used as a measure of similarity, then Documents 1 and 8 are more similar than Documents 1 and 2. This is true in both the tables of FIG. 8 and FIG. 9. This is because Documents 1 and 8 share the word "check", while Documents 1 and 2 have no words in common. In actuality, however, Documents 1 and 8 are not related at all, but Documents 1 and 2 are very similar. After the truncation process block 170 has completed in FIG. 2B, then the reduced dimensions are merged at process block 172 with all structured data that are related to each document. Before processing terminates at end block 176, data mining is performed at process block 174.

In general, it is noted that the truncation approach of process block 170 has deficiencies. It does not take into account terms that are highly correlated with each other, such as synonyms. As a result, this technique usually needs to employ a useful stemming algorithm, as well. Also, documents are rated close to each other only according to co-occurrence of terms. Documents may be semantically similar to each other while having very few of the truncated terms in common. Most of these terms only occur in a small percentage of the documents. The words used need to be recomputed for each category of interest.

Figure 9:
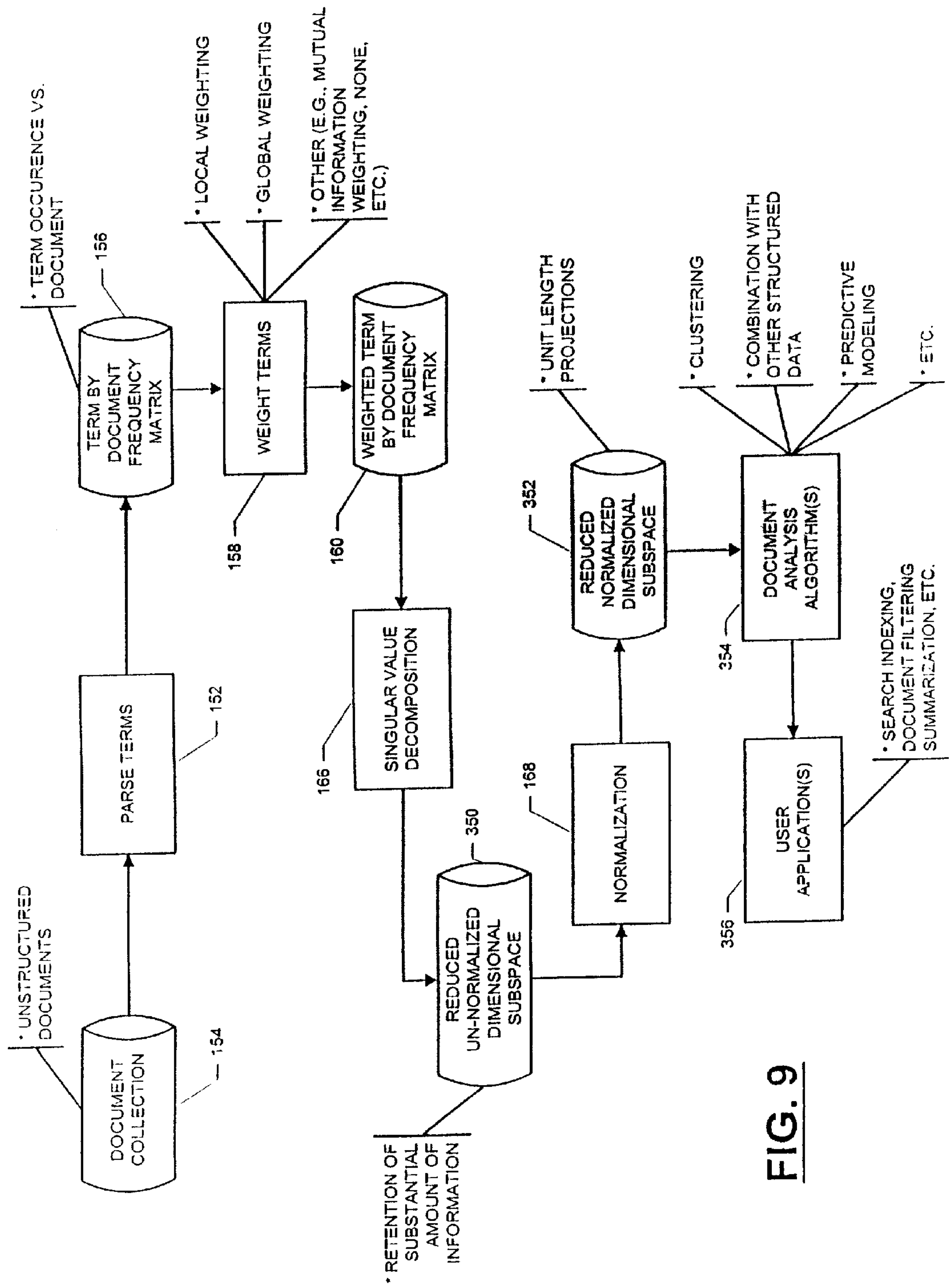
FIG. 9 is a flowchart depicting different user applications that may be used with the document processing system.

FIG. 9 illustrates a diverse range of user applications 356 that may utilize the reduced normalized dimensional subspace 352. Such user applications may include search indexing, document filtering, and summarization.

The reduced normalized dimensional subspace 352 may also be used by a diverse range of document analysis algorithms 354 that act as an analytical engine for the user applications 356. Such document analysis algorithms 354 include the document clustering technique of Latent Semantic Analysis (LSA).

Other types of document analysis algorithms 354 may be used such as those used for predictive modeling. FIGS. 10–12 illustrate an example of the document processing system's use in connection with two predictive modeling techniques—memory-based reasoning (MBR) and neural networks. Memory-based reasoning (MBR), neural networks, and other techniques may be used to predict document categories based on the result of the system's normalized dimensionality reduction technique.

In memory-based reasoning, a predicted value for a dependent variable is determined based on retrieving the k nearest neighbors to the dependent variable and having them vote on the value. This is potentially useful for categorization when there is no rule that defines what the target value should be. Memory-based reasoning works particularly well when the terms have been compressed using the SVD, since the Euclidean distance is a natural measure for determining the nearest neighbors.

For the neural network predictive tool, this example used a nonlinear neural network containing two hidden layers. Nonlinear neural networks are capable of modeling higher-order term interaction. An advantage of neural networks is the ability to predict multiple binary targets simultaneously by a single model. However, when the term weighting is dependent on the category (as in mutual information) a separate network is trained for each category.

To evaluate the document processing system in connection with these two predictive modeling techniques, a standard test-categorization corpus was used—the Modapte testing-training split of Reuters newswire data. This split places 9603 stories into the training data and 3299 stories for testing. Each article in the split has been assigned to one or more of a total of 118 categories. Three of the categories have no training data associated with them and many of the categories are underrepresented in the training data. For this reason the example's results are presented for the top ten most often occurring categories.

The Modapte split separates the collection chronologically for the test-training split. The oldest documents are placed in the training set and the most recent documents are placed in the testing set. The split does not contain a validation set. A validation set was created by partitioning the Modapte training data into two data sets chronologically. The first 75% of the Modapte training documents were used for our training set and the remaining 25% were used for validation.

The top ten categories are listed in column 380 of FIG. 10, along with the number of documents available for testing (shown in column 382), validation (shown in column 384) and training (shown in column 386). All the results given for this example were derived after first removing nondiscriminating terms such as articles and prepositions with a stop list. The example did not consider any terms that occurred in fewer than two of the documents in the training data.

For the choice of local and global weights, there are 15 different combinations. The SVD and MBR were used while varying k in order to illustrate the effect of different weightings. The example also compared the mutual information weighting criterion with the various combinations of local and global weighting schemes. In order to examine the effect of different weightings, the documents were classified after doing a SVD using values of k in increments of 10 from k=10 to k=200. For this example, the predictive model was built with the memory-based reasoning node.

The average of precision and recall were then considered in order to determine the effect of different weightings and dimensions. It is noted that precision and recall may be used to measure the ability of search engines to return documents that are relevant to a query and to avoid returning documents that are not relevant to a query. The two measures are used in the field to determine the effectiveness of a binary text classifier. In this context, a "relevant" document is one that actually belongs to the category. A classifier has high precision if it assigns a low percentage of "non-relevant" documents to the category. On the other hand, recall indicates how well the classifier was able to find "relevant" documents and assign them to the category. The recall and precision can be calculated from the two-way contingency as found in the following table:

| | | Actual | |
|---|---|---|---|
| | | 1 | 0 |
| Predicted | 1 | A | B |
| | 0 | C | D |

If A is the number of documents predicted to be in the category that actually belong to the category, A+C is the number of documents that actually belong to the category, and A+B is the number of documents predicted to be in the category, then $$\text{Precision}=A/(A+B) \text{ and } \text{Recall}=A/(A+C).$$

Obtaining both high precision and high recall are generally mutually conflicting goals. If one wants a classifier to obtain a high precision then only documents are assigned to the category that are definitely in the category. Of course, this would be done at the expense of missing some documents that might also belong to the category and, hence, lowering the recall. The average of precision and recall may be used to combine the two measures into a single result.

The table shown in FIG. 11 summarizes the findings by comparing the best local-global weighting scheme for each category with the mutual information result. The results show that the log-entropy and log-IDF weighting combinations consistently performed well. The binary-entropy and binary-IDF also performed fairly well. The microavg category at the bottom was determined by calculating a weighted average based on the number of documents that were contained in each of the ten categories. In this example depending on the category and the weighting combination, the optimal values of k varied from 20 to as much as 200. Within this range of values, there were often several local maximum values. It should be understood that this is only an example and results and values may vary based upon the situation at hand.

The truncation approach was also examined and compared to the results of the document processing system. The number of dimensions was fixed at 80. It is noted that truncation is highly sensitive to which k terms are chosen and may need many more dimensions in order to produce the same predictive power as the document processing system.

Because terms with a high mutual information weighting do not necessarily occur very many times in the collection as a whole, the mutual information weight was first multiplied by the log of the frequency of the term. The highest 80 terms according to this product were kept. This ensured that at least a few terms were kept from every document.

The results for the truncation approach using mutual information came in lower than that of the document processing system for many of the ten categories and about 50% worse overall (see the micro-averaged case). The results are shown in the table of FIG. 12. The SVD performed well across the categories and even in the categories whose documents did not contain similar vocabulary. This exemplifies the capability of the document processing system to automatically account for polysemy and synonymy. The document processing system also does not require a category-dependent weighting scheme in order to generate reasonable categorization averages, as the table of FIG. 11 reveals.

The table of FIG. 12 also includes results that compare the neural network approach to that of MBR. On average, the neural network slightly outperformed MBR for both the SVD and the Truncation reductions. The differences, however, appear to be category dependent. It is noted that relative to local-global weighting, the document processing system seems to reach an asymptote with fewer dimensions when using the mutual information weighting.

While examples have been used to disclose the invention, including the best mode, and also to enable any person skilled in the art to make and use the invention, the patentable scope of the invention is defined by the claims, and may include other examples that occur to those skilled in the art.

As an example of the wide scope, the document processing system may be used in a category-specific weighting scheme when clustering documents (note that the truncation technique has difficulty in such as situation because truncation with a small number of terms is difficult to apply in that situation). As yet another example of the wide scope of the document processing system, the document processing system may first make a decision about whether a given document belongs within a certain hierarchy. Once this is determined, a decision could be made as to which particular category the document belongs. It is noted that the document processing system and method may be implemented on various types of computer architectures and computer readable media that contain instructions to be executed by a computer. Also, the data (such as the frequency of terms data, the normalized reduced projections within the subspace, etc.) may be stored as one or more data structures in computer memory depending upon the application at hand.

Figure 13:
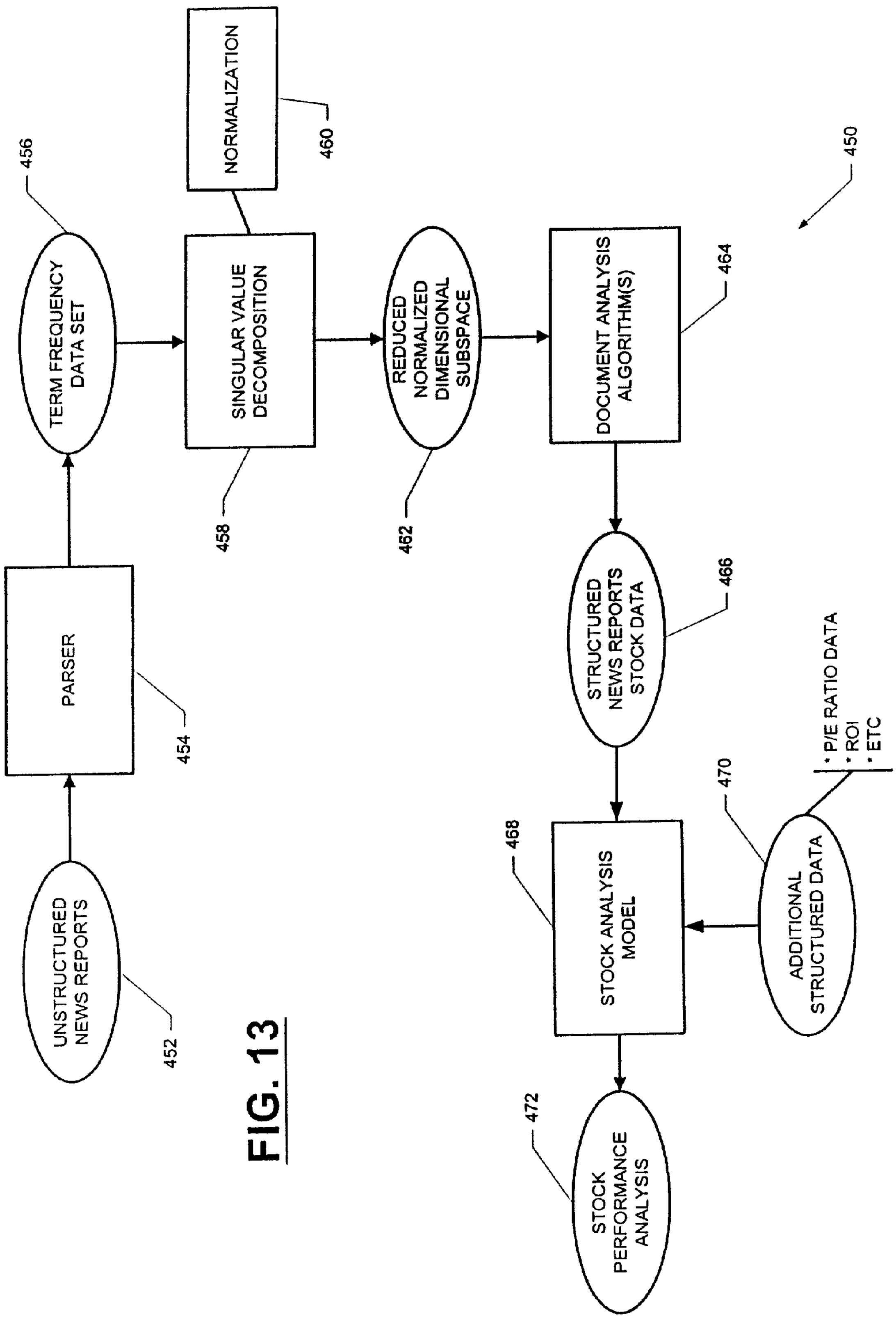
FIG. 13 is a block diagram depicting software and computer components used in an example directed to processing news reports.

In addition, the normalized dimension values can be combined with any other structured data about the document or otherwise to enhance the predictive or clustering activity. For example as shown in FIG. 13, unstructured stock news reports 452 may be processed by the document processing system 450. A parser 454 generates a term frequency data set 456 from the unstructured stock news reports 452. The SVD procedure 458 and the normalization procedure 460 result in the creation of the reduced normalized dimensional subspace 462 for the unstructured reports 452. One or more document algorithms 464 complete the formation of structured data 466 from the unstructured news reports 452. The stock news reports structured data 466 may then be used with other stock-related structured data 470, such as within a stock analysis model 468 that predicts stock performance 472.

As an example, the document processing system 450 may form structured data 466 that indicates whether companies' earnings are rising or declining and the degree of the change (e.g., a large increase, small increase, etc.). Because the SVD procedure 458 examines the interrelationships among the variables of a document as well as the normalization procedure 460, the unstructured news reports 452 can be examined at a semantic level through the reduced normalized dimensional subspace 462 and then further examined through document analysis algorithms 464 (such as predictive modeling or clustering algorithms). Thus even if the unstructured news reports 452 use different terms to express the condition of the companies' earnings, the data 466 accurately reflects in a structured way a company's current earnings condition.

The stock analysis model 468 combines the structured earnings data 466 with other relevant stock-related structured data 470, such as company price-to-earnings ratio data, stock historical performance data, and other such company fundamental information. From this combination, the stock analysis model 468 forms predictions 472 about how stock prices will vary over a certain time period, such as over the next several days, weeks or months. It should be noted that the stock analysis can be done in real-time for a multitude of unstructured news reports and for a large number of companies. It should also be understood that many other types of unstructured information may be analyzed by the document processing system 450, such as police reports or customer service complaint reports. Other uses may include using the document processing system 450 with identifying United States patents based upon an input search string. Still further, other techniques such as the truncation technique described above may be used to create structured data from unstructured data so that the created structured data may be linked with additional structured data (e.g., company financial data).

Figure 14:
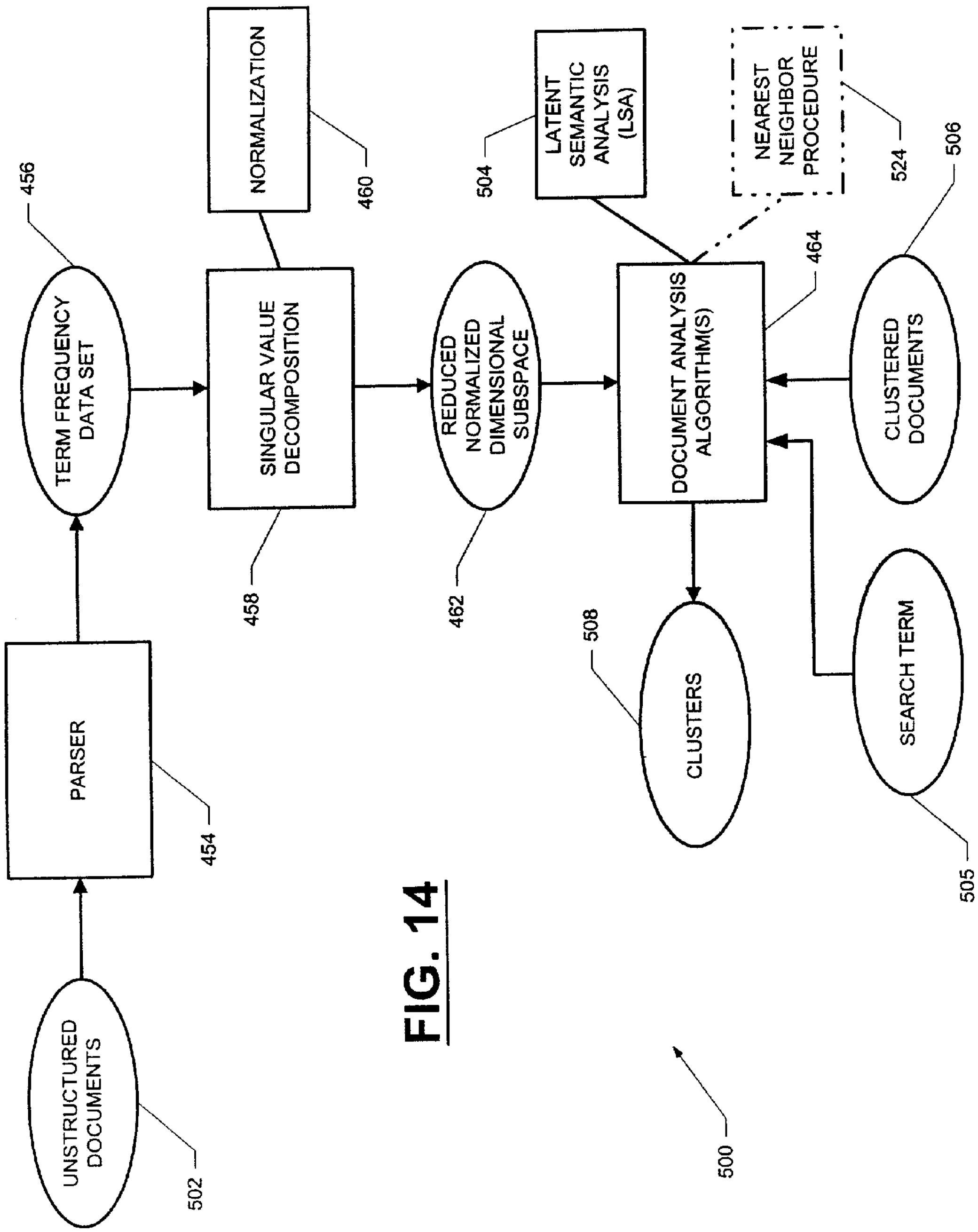
FIG. 14 is a block diagram depicting a nearest neighbor technique used in a clustering.

As further illustration of the wide scope of the document processing system, FIG. 14 shows an example of different document analysis algorithms 464 using the reduced normalized dimensional subspace 462 for clustering unstructured documents 502 with other documents 506. Document analysis algorithms 464 may include the document clustering technique of Latent Semantic Analysis (LSA) 500. LSA may be used with information retrieval because with LSA 500, one could use a search term 505 to retrieve relevant documents by selecting all documents where the cosine of the angle between the document vector within the reduced normalized dimensional subspace 352 and the search term vector is below some critical threshold. A problem with this approach is that every document vector must be compared in order to find the ones most relevant to the query.

As another searching technique, a nearest neighbor procedure 524 may be performed in place of the LSA procedure 500. The nearest neighbor procedure 524 uses the normalized vectors in the subspace 462 to locate the k nearest neighbors to the search term 505. Because a vector normalization is done beforehand by module 460, one can use the nearest neighbor procedure 524 for identifying the documents to be retrieved. The nearest neighbor procedure 524 is described in FIGS. 15–18B as well as in the following pending patent application (whose entire disclosure including its drawings is incorporated by reference herein): "Nearest Neighbor Data Method and System", Ser. No. 09/764,742, filed Jan. 18, 2001. (It should be understood that other searching techniques may be used, such as KD-Trees, R-Trees, BBD-Trees).

Figure 15:
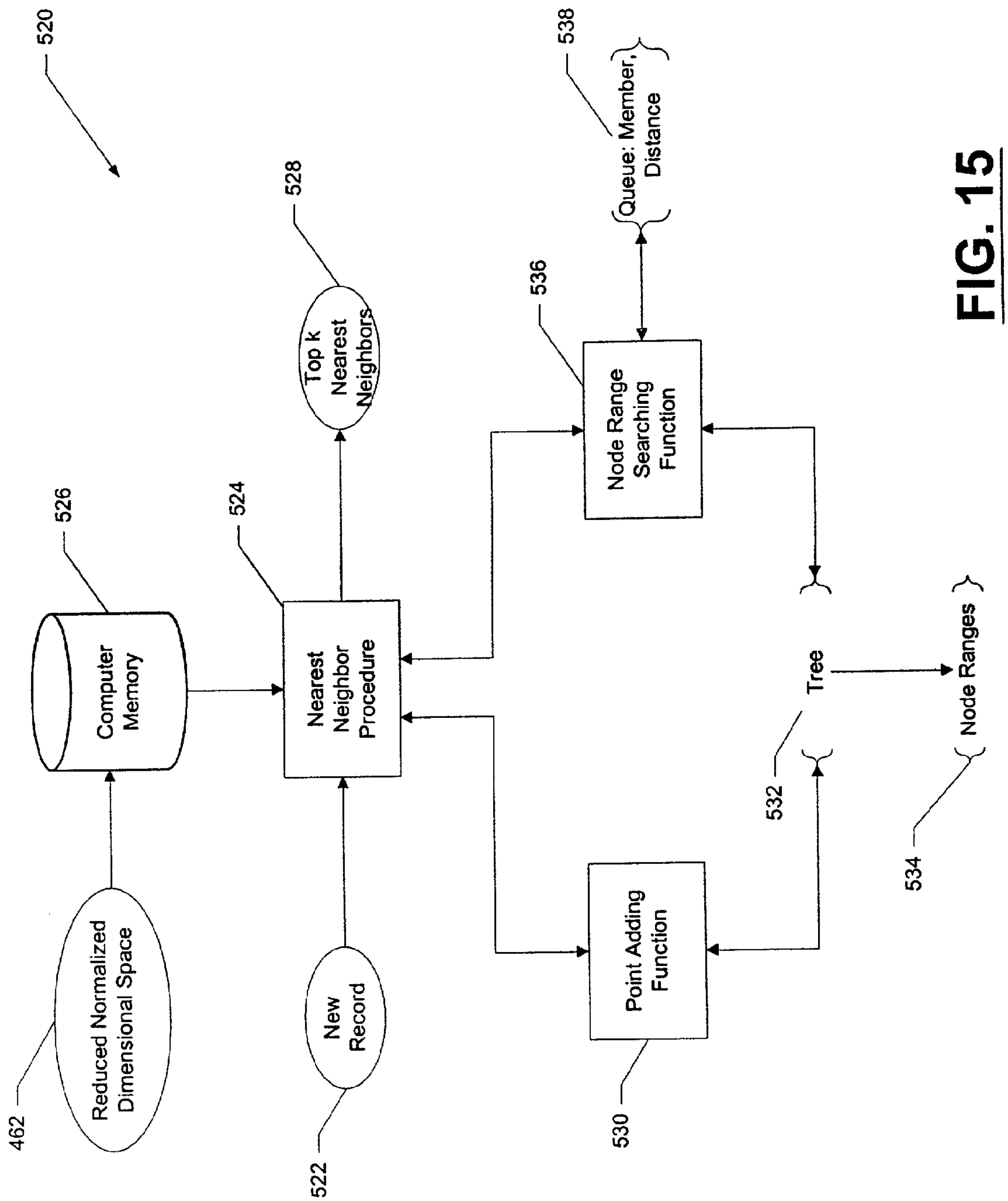
FIG. 15 is a system block diagram depicting an example of a nearest neighbor search environment.

FIG. 15 depicts an exemplary environment of the nearest neighbor procedure 524. Within the environment, a new record 522 is sent to the nearest neighbor procedure 524 so that records most similar to the new record can be located in computer memory 526. Computer memory 526 preferably includes any type of computer volatile memory, such as RAM (random access memory). Computer memory 526 may also include non-volatile memory, such as a computer hard drive or data base, as well as computer storage that is used by a cluster of computers. The system may be used as an in-memory searching technique. However, it should be understood that the system may also include many other uses, such as iteratively accessing computer storage (e.g., a database) in order to perform the searching method.

When the new record 522 is presented for pattern matching, the distance between it and similar records in the computer memory 526 is determined. The records with the kth smallest distance from the new record 522 are identified as the most similar (or nearest neighbors). Typically, the nearest neighbor module returns the top k nearest neighbors 528. It should be noted that the records returned by this technique (based on normalized distance) would exactly match those using the LSA technique described above (based on cosines)—but only a subset of the possible records need to be examined. First, the nearest neighbor procedure 524 uses the point adding function 530 to partition data from the database 526 into regions. The point adding function 530 constructs a tree 532 with nodes to store the partitioned data. Nodes of the tree 532 not only store the data but also indicate what data portions are contained in what nodes by indicating the range 534 of data associated with each node.

When the new record 522 is received for pattern matching, the nearest neighbor procedure 524 uses the node range searching function 536 to determine the nearest neighbors 528. The node range searching function 536 examines the data ranges 534 stored in the nodes to determine which nodes might contain neighbors nearest to the new record 522. The node range searching function 536 uses a queue 538 to keep a ranked track of which points in the tree 532 have a certain minimum distance from the new record 522. The priority queue 538 has k slots which determines the queue's size, and it refers to the number of nearest neighbors to detect. Each member of the queue 538 has an associated real value which denotes the distance between the new record 522 and the point that is stored in that slot.

Figure 16A:
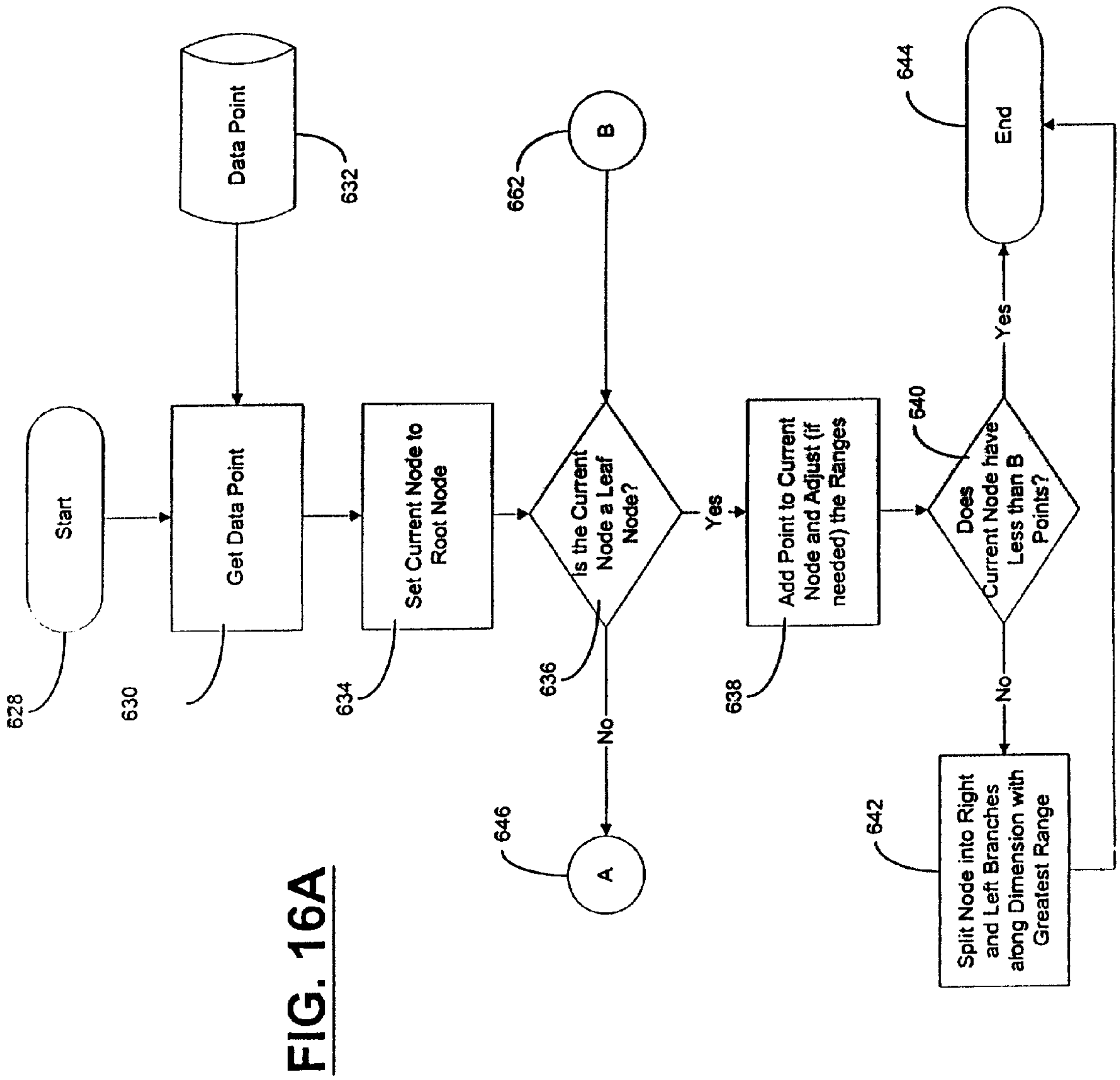
FIGS. 16A and 16B are flow charts depicting steps to add a point within a nearest neighbor environment.

FIG. 16A is a flow chart depicting the steps to add a point to the tree of the nearest neighbor procedure. Start block 628 indicates that block 630 obtains data point 632. This new data point 632 is an array of n real-valued attributes. Each of these attributes is referred to as a dimension of the data. Block 634 sets the current node to the root node. A node contains the following information: whether it is a branch (no child nodes) or leaf (it has two children nodes), and how many points are contained in this node and all its descendants. If it is a leaf, it also contains a list of the points contained therein. The root node is the beginning node in the tree and it has no parents. The system stores the minimum and maximum values (i.e., the range) for the points in the subnodes and stores descendants along the dimension that its parent was split.

Decision block 636 examines whether the current node is a leaf node. If it is, block 638 adds data point 632 to the current node. This concatenates the input data point 632 at the end of the list of points contained in the current node. Moreover, the minimum value is updated if the current point is less than the minimum, or the maximum value is updated if the current point's value is greater than the maximum.

Decision block 640 examines whether the current node has less than B points. B is a constant defined before the tree is created. It defines the maximum number of points that a leaf node can contain. An exemplary value for B is eight. If the current node does have less than B points, then processing terminates at end block 644.

However, if the current node does not have less than B points, block 642 splits the node into right and left branches along the dimension with the greatest range. In this way, the system has partitions along only one axis at a time, and thus it does not have to process more than one dimension at every split.

All n dimensions are examined to determine the one with the greatest difference between the minimum value and the maximum value for this node. Then that dimension is split along the two points closest to the median value—all points with a value less than the value will go into the left-hand branch, and all those greater than or equal to that value will go into the right-hand branch. The minimum value and the maximum value are then set for both sides. Processing terminates at end block 644 after block 642 has been processed.

Figure 16B:
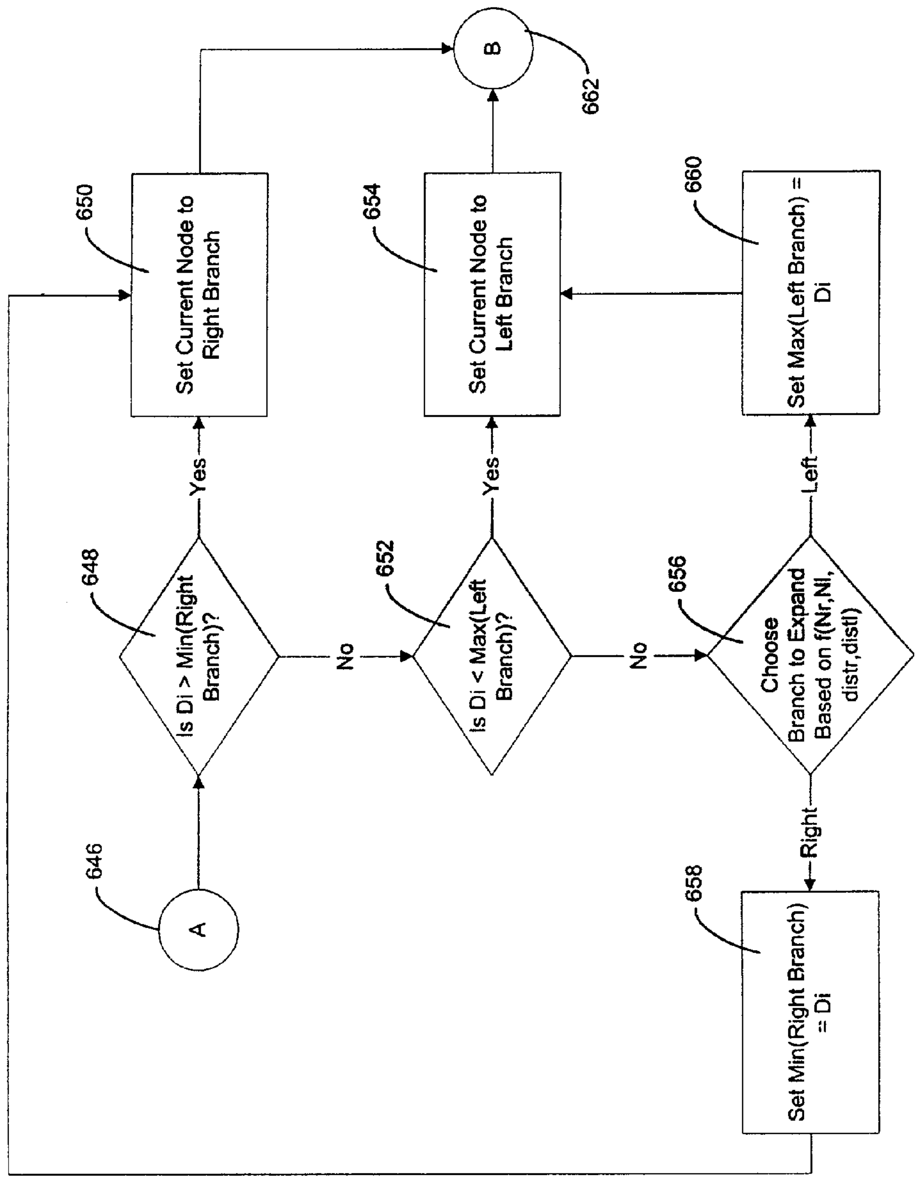

If decision block 636 determines that the current node is not a leaf node, processing continues on FIG. 16B at continuation block 646. With reference to FIG. 16B, decision block 648 examines whether $D_i$ is greater than the minimum of the right branch (note that $D_i$ refers to the value for the new point on the dimension with the greatest range). If $D_i$ is greater than the minimum, block 650 sets the current node to the right branch, and processing continues at continuation block 662 on FIG. 16A.

If $D_i$ is not greater than the minimum of the right branch as determined by decision block 648, then decision block 652 examines whether $D_i$ is less than the maximum of the left branch. If it is, block 654 sets the current node to the left branch and processing continues on FIG. 16A at continuation block 662.

If decision block 652 determines that $D_i$ is not less than the maximum of the left branch, then decision block 656 examines whether to select the right or left branch to expand. Decision block 656 selects the right or left branch based on the number of points on the right-hand side ($N_r$), the number of points on the left-hand side ($N_l$), the distance to the minimum value on the right-hand side ($dist_r$), and the distance to the maximum value on the left-hand side ($dist_l$). When $D_i$ is between the separator points for the two branches, the decision rule is to place a point in the right-hand side if $(Dist_l/Dist_r)(N_l/N_r)>1$. Otherwise, it is placed on the left-hand side. If it is placed on the right-hand side, then process block 658 sets the minimum of the right branch to $D_i$ and process block 650 sets the current node to the right branch before processing continues at continuation block 662. If the left branch is chosen to be expanded, then process block 660 sets the maximum of the left branch to $D_i$. Process block 654 then sets the current node to the left branch before processing continues at continuation block 662 on FIG. 16A.

With reference back to FIG. 16A, continuation block 662 indicates that decision block 636 examines whether the current node is a leaf node. If it is not, then processing continues at continuation block 646 on FIG. 16B. However, if the current node is a leaf node, then processing continues at block 638 in the manner described above.

Figure 17A:
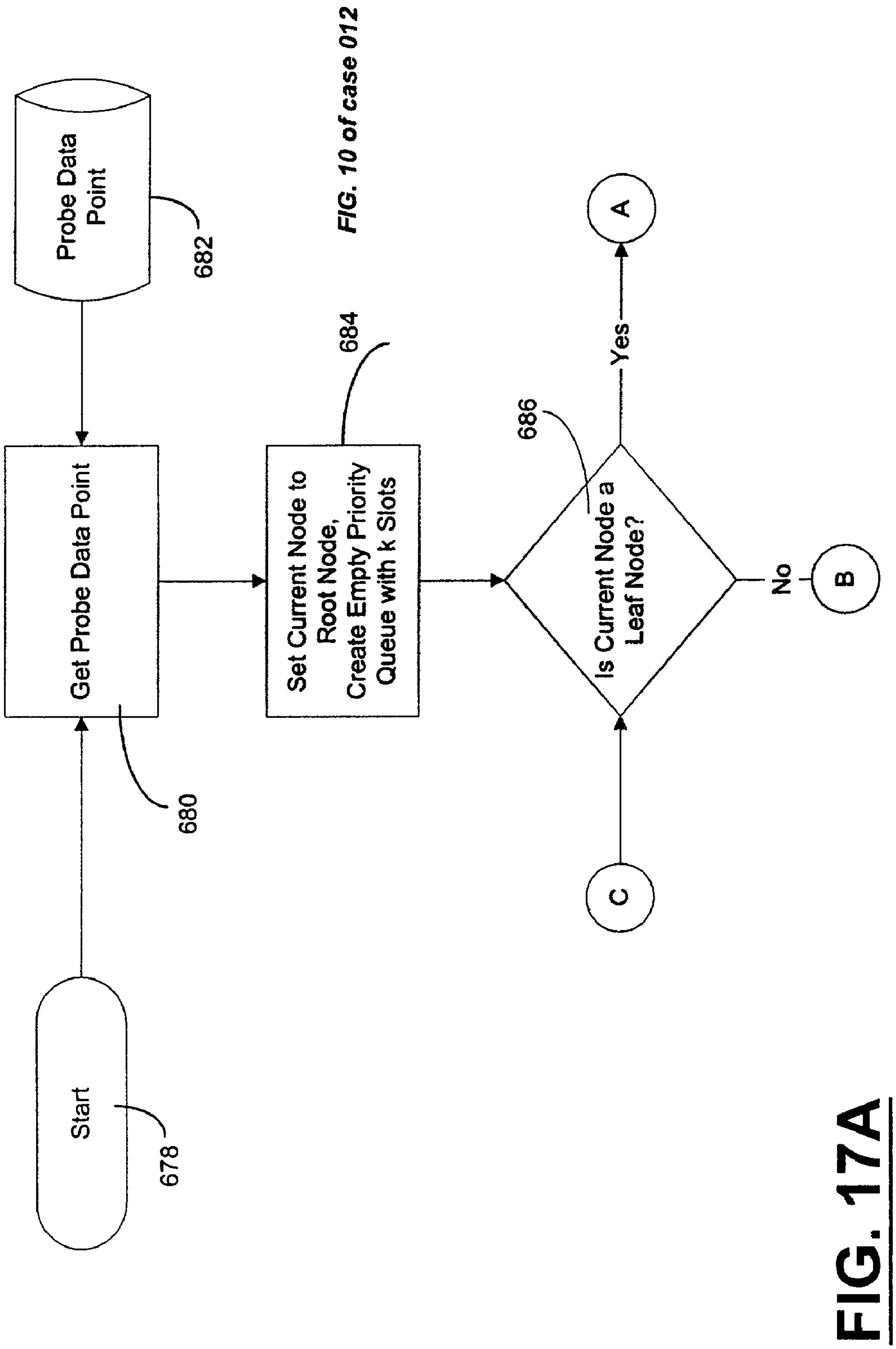
FIGS. 17A and 17B are flow charts depicting steps to locate a nearest neighbor.
Figure 17B:
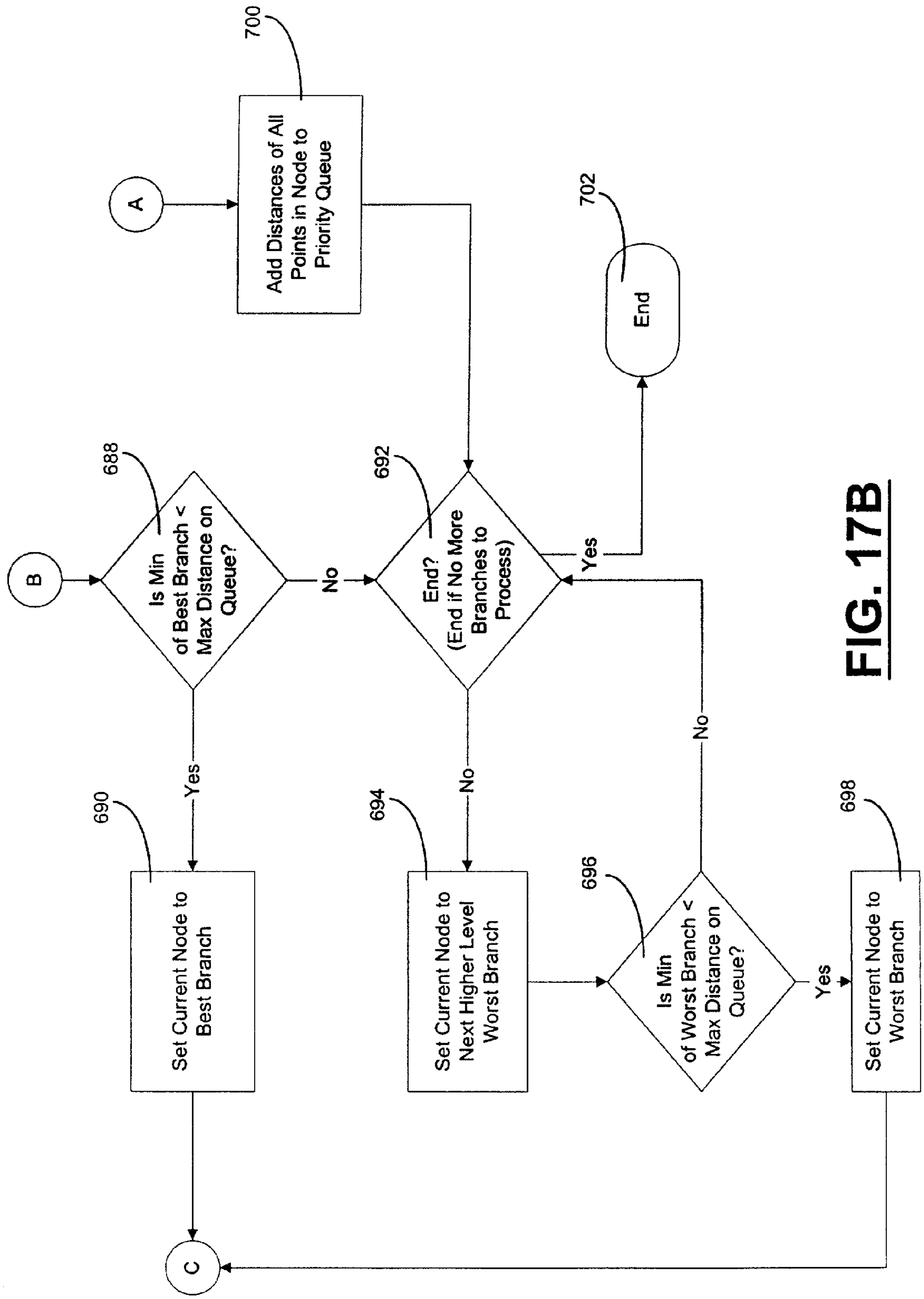

FIGS. 17A and 17B are flow charts depicting steps to find the nearest neighbors given a probe data point 682. Start block 678 indicates that block 680 obtains a probe data point 682. The probe data point 682 is an array of n real-valued attributes. Each attribute denotes a dimension. Block 684 sets the current node to the root node and creates an empty queue with k slots. A priority queue is a data representation normally implemented as a heap. Each member of the queue has an associated real value, and items can be popped off the queue ordered by this value. The first item in the queue is the one with the largest value. In this case, the value denotes the distance between the probe point 682 and the point that is stored in that slot. The k slots denote the queue's size, in this case, it refers to the number of nearest neighbors to detect.

Decision block 686 examines whether the current node is a leaf node. If it is not, then decision block 688 examines whether the minimum of the best branch is less than the maximum distance on the queue. For this examination in decision block 688, "i" is set to be the dimension on which the current node is split, and $D_i$ is the value of the probe data point 682 along that dimension. The minimum distance of the best branch is computed as follows:

$$totdist = \sum_{j=1}^{n} \text{Min}dist_j$$

Whichever is smaller is used for the best branch, the other being used later for the worst branch. An array having of all these minimum distance values is maintained as we proceed down the tree, and the total squared Euclidean distance is:

$$\text{Min}dist_i = \begin{cases} 0; & \text{if } \min_i \le D_i \le \max_i \\ (\min_i - D_i)^2, & \text{if } \min_i > D_i \text{ for both the left and the right branches} \\ (\max_i - D_i)^2, & \text{otherwise} \end{cases}$$

Since this is incrementally maintained, it can be computed much more quickly as totdist (total distance)=Min $dist_{i,old}$+Min $dist_{i,new}$. This condition evaluates to true if totdist is less than the value of the distance of the first slot on the priority queue, or the queue is not yet full.

If the minimum of the best branch is less than the maximum distance on the priority queue as determined by decision block 688, then block 690 sets the current node to the best branch so that the best branch can be evaluated. Processing then branches to decision block 686 to evaluate the current best node.

However, if decision block 688 determines that the minimum of the best branch is not less than the maximum distance on the queue, then decision block 692 determines whether processing should terminate. Processing terminates at end block 702 when no more branches are to be processed (e.g., if higher level worst branches have not yet been examined).

If more branches are to be processed, then processing continues at block 694. Block 694 set the current node to the next higher level worst branch. Decision block 696 then evaluates whether the minimum of the worst branch is less than the maximum distance on the queue. If decision block 696 determines that the minimum of the worst branch is not less than the maximum distance on the queue, then processing continues at decision block 692.

Note that as we descend the tree, we maintain the minimum squared Euclidean distance for the current node, as well as an n-dimensional array containing the square of the minimum distance for each dimension split on the way down the tree. A new minimum distance is calculated for this dimension by setting it to the square of the difference of the value for that dimension for the probe data point 682 and the split value for this node. Then we update the current squared Euclidean distance by subtracting the old value of the array for this dimension and adding the new minimum distance. Also, the array is updated to reflect the new minimum value for this dimension. We then check to see if the new minimum Euclidean distance is less than the distance of the first item on the priority queue (unless the priority queue is not yet full, in which case it always evaluates to yes).

If decision block 696 determines that the minimum of the worst branch is not less than the maximum distance on the queue, then processing continues at block 698 wherein the current node is set to the worst branch. Processing continues at decision block 686.

If decision block 686 determines that the current node is a leaf node, block 700 adds the distances of all points in the node to the priority queue. In this way, the distances of all points in the node are added to the priority queue. The squared Euclidean distance is calculated between each point in the set of points for that node and the probe point 682. If that value is less than or equal to the distance of the first item in the queue, or the queue is not yet full, the value is added to the queue. Processing continues at decision block 692 to determine whether additional processing is needed before terminating at end block 702.

The invention claimed is:

1. A computer-implemented method for processing text-based documents, comprising the steps of:

generating frequency of terms data for terms appearing in the documents;

performing singular value decomposition upon the frequency of terms data in order to form projections of the terms and documents into a reduced dimensional subspace, normalizing the projections to a pre-selected length; and using the normalized projections to provide structured data about the documents.

2. The method of claim 1 wherein the documents comprise unstructured data.

3. The method of claim 2 wherein the documents comprise free-form text.

4. The method of claim 3 wherein the documents comprise images.

5. The method of claim 1 wherein the frequency of terms data is generated for a subset of the terms appearing in the documents.

6. The method of claim 1 further comprising the step of:

parsing the documents so as to generate the frequency of terms data, said frequency of terms data indicating the frequency of terms within the documents.

7. The method of claim 6 wherein the terms comprise single word entries.

8. The method of claim 6 wherein the terms comprise a multi-word token.

9. The method of claim 6 wherein the terms comprise entities.

10. The method of claim 1 wherein the frequency of terms data comprises unweighted frequency of terms data, said singular value decomposition being performed upon the frequency of terms data which is unweighted.

11. The method of claim 1 wherein the frequency of terms data comprises weighted frequency of terms data, said singular value decomposition being performed upon the frequency of terms data which has been weighted.

12. The method of claim 11 wherein the weighting of the frequency of terms data is used to provide discrimination among documents.

13. The method of claim 11 wherein the weighting of the frequency of terms data is based upon frequency that a term appears in the documents.

14. The method of claim 11 wherein the weighting of the frequency of terms data is based upon a local weighting approach.

15. The method of claim 11 wherein the weighting of the frequency of terms data is based upon a global weighting approach.

16. The method of claim 11 wherein the weighting of the frequency of terms data is based upon a target variable.

17. The method of claim 11 wherein the weighting of the frequency of terms data is based upon a mutual information weighting process.

18. The method of claim 11 wherein the weighting of the frequency of terms data is based upon an information gain weighting process.

19. The method of claim 1 wherein the frequency of terms data comprises a rectangular un-normalized data set, said performing singular value decomposition step including performing the singular value decomposition upon the rectangular un-normalized data set.

20. The method of claim 1 wherein the singular value decomposition reduces the dimension of the frequency of terms data from n-dimensional space to k-dimensional subspace.

21. The method of claim 1 wherein the singular value decomposition uses a truncated singular value decomposition to reduce the dimension of the frequency of terms data from n-dimensional space to k-dimensional subspace.

22. The method of claim 1 wherein the normalized projections force their vectors to lie on the surface of a unit sphere around zero.

23. The method of claim 1 wherein the singular value decomposition results in the documents being represented as vectors in a best-fit k-dimensional subspace, wherein the vectors are normalized with respect to a unit measurement thereby creating a normalized reduced dimensional subspace, said normalized reduced dimensional subspace being used in analysis of the documents.

24. The method of claim 23 wherein the number of k dimensions is selected in order to exclude noise within the normalized reduced dimensional space while including the signal in the normalized reduced dimensional space.

25. The method of claim 23 wherein the sum of the squared distances of the magnitudes of two vectors is isomorphic to the cosines between the vectors.

26. The method of claim 1 wherein a vector within the normalized reduced dimensional subspace can be represented on a unit hypersphere so that Euclidean distances between points directly correspond to the dot products of their vectors.

27. The method of claim 1 wherein the projections within the normalized dimensional subspace automatically account for polysemy existing within the documents.

28. The method of claim 27 wherein the projections within the normalized dimensional subspace automatically account for synonymy existing within the documents.

29. The method of claim 1 wherein a predetermined document analysis algorithm uses the normalized projections to analyze the documents.

30. The method of claim 1 wherein Latent Semantic Analysis uses the normalized projections to analyze the documents.

31. The method of claim 1 further comprising the step of:
using the normalized projections for clustering the documents.

32. The method of claim 1 further comprising the step of:
using the normalized projections for categorizing the documents.

33. The method of claim 1 further comprising the step of:
using the normalized projections for combining at least one of the documents within a pre-existing corpus of structured documents.

34. The method of claim 1 further comprising the step of:
using the normalized projections in predictive modeling of the documents.

35. The method of claim 34 wherein a memory-based reasoning module uses the normalized projections to predict document categories for the documents.

36. The method of claim 34 wherein a neural network uses the normalized projections to predict document categories for the documents.

37. Computer software stored on a computer readable media, the computer software comprising program code for carrying out a method according to claim 1.

38. The method of claim 1 further comprising:
using the normalized projections in order to cluster. categorize, and combine with other documents.

39. The method of claim 1 further comprising:
receiving a search term; and
using the normalized projections with latent semantic analysis (LSA) in order to determine which of the documents are relevant to the search term.

40. The method of claim 1 further comprising:
receiving a search term; and
using the normalized projections with a nearest neighbor procedure to determine a subset of the documents based upon the received search term.

41. The method of claim 40 wherein the nearest neighbor procedure performs steps comprising:
receiving the search term that seeks neighbors to a probe data point;
evaluating nodes in a data tree to determine which data points neighbor a probe data point, wherein the data points are based upon the normalized projections,
wherein the nodes contain the data points, wherein the nodes are associated with ranges for the data points included in their respective branches; and determining which data points neighbor the probe data point based upon the data point ranges associated with a branch.

42. The method of claim 41 wherein the nearest neighbor procedure uses the normalized projections to determine distances between the probe data point and the data points of the tree based upon the ranges.

43. The method of claim 42 wherein the nearest neighbor procedure determines nearest neighbors to the probe data point based upon the determined distances.

44. The method of claim 41 wherein the nearest neighbor procedure uses the normalized projections to determine distances between the probe data point and the data points of the tree based upon the ranges,
wherein the nearest neighbor procedure selects as nearest neighbors a preselected number of the data points whose determined distances are less than the remaining data points.

45. The method of claim 44 wherein the nearest neighbor procedure constructs the data tree by partitioning the data points from a database into regions.

46. The method of claim 40 wherein the nearest neighbor procedure uses a KD-Tree procedure.

47. The method of claim 40 wherein the nearest neighbor procedure uses a nearest neighbor procedure means.

48. The method of claim 1 wherein the documents comprise unstructured patent documents.

49. A computer-implemented method for processing unstructured text-based documents, comprising the steps of:
using a dimensionality reduction procedure in order to form projections of unstructured documents' terms into a reduced dimensional subspace;
using the reduced dimensional subspace to generate structured data about the unstructured documents;
combining the structured document data with additional structured data; and
analyzing the combined structured data.

50. The method of claim 49 wherein the dimensionality reduction procedure uses a truncation procedure.

51. The method of claim 49 wherein the dimensionality reduction procedure uses a singular value decomposition procedure.

52. The method of claim 49 wherein the dimensionality reduction procedure uses singular value decomposition procedure means and normalization procedure means.

53. The method of claim 49 wherein the dimensionality reduction procedure uses a singular value decomposition procedure to form the projections of the unstructured documents' terms into the reduced dimensional subspace, wherein the projections are normalized to a pre-selected length, wherein the normalized projections are used to generate structured data about the unstructured documents.

54. The method of claim 53 wherein the reduced dimensional subspace is a normalized reduced dimensional subspace containing the normalized projections.

55. The method of claim 49 wherein the additional structured data comprises structured data generated independently of the generation of the structured document data.

56. The method of claim 49 wherein the additional structured data comprises structured data generated independently of the use of the reduced dimensional subspace to generate the structured document data.

57. The method of claim 49 wherein the unstructured documents include stock news reports, wherein the additional structured data comprises company financial data.

58. The method of claim 57 wherein the analyzing of the combined structured data comprises predicting stock performance.

59. A computer-implemented apparatus for processing text-based documents, comprising:

means for generating frequency of terms data for terms appearing in the documents;

means for performing singular value decomposition upon the frequency of terms data in order to form projections of the terms and documents into a reduced dimensional subspace, means for normalizing the projections to a pre-selected length; and means for using the normalized projections to provide structured data about the documents.

60. A memory for storing data for access by a computer program being executed on a data processing system, comprising a data structure stored in said memory, said data structure including:

frequency of terms data for terms appearing in unstructured text-based documents; and normalized reduced projections of the frequency of terms data, wherein the normalized reduced projections are used by the computer program to generate structured data about the unstructured text-based documents.

* * * * *

UNITED STATES PATENT AND TRADEMARK OFFICE

CERTIFICATE OF CORRECTION

PATENT NO. : 6,996,575 B2
DATED : February 7, 2006
INVENTOR(S) : Cox et al.

It is certified that error appears in the above-identified patent and that said Letters Patent is hereby corrected as shown below:

Column 17,
Line 66, delete "cluster." and insert -- cluster, --.

Column 18,
Line 20, after "and" insert a new paragraph.

Signed and Sealed this

Fourth Day of April, 2006

JON W. DUDAS
*Director of the United States Patent and Trademark Office*